United States Patent Office 2,888,446
Patented May 26, 1959

2,888,446

MANUFACTURE OF ETHYLENIC FLUORINE-CONTAINING POLYMERS

Ralph L. Herbst, Jr., Westfield, and Billy F. Landrum, Belleville, N.J., assignors, by mesne assignments, to Minnesota Mining and Manufacturing Company, St. Paul, Minn., a corporation of Delaware No Drawing. Application August 26, 1954
Serial No. 452,466

9 Claims. (Cl. 260—87.5)

This invention relates to the manufacture of fluorine-containing polymers; more particularly to the polymerization of halogenated olefins containing fluorine to produce polymers thereof.

Various olefins containing fluorine may be polymerized under suitable conditions to produce polymers which may be liquids, waxes, or solids. Trifluorochloroethylene, for example, polymerizes to produce a series of polymers of different molecular weights, which are useful for various purposes. These polymers are relatively inert chemically and have generally good physical properties. The oily polymer of trifluorochloroethylene may be employed as a lubricating or insulating medium, while the waxes produced by polymerizing trifluorochloroethylene are useful in producing lubricating compositions and as impregnating materials. The solid polymer of trifluorochloroethylene in the high molecular weight range has the characteristics of a thermoplastic and is useful for a variety of purposes for which plastics may be employed.

In accordance with the present invention, it has been found that a substituted ethylene containing at least two fluorine atoms and preferably at least one fluorine per carbon atom of the aliphatic portion of the substituted ethylene may be polymerized under substantially anhydrous conditions, employing suitable conditions of temperature, pressure, residence time, and hydrogen peroxide promoting agent to produce a polymer which may be a liquid, wax, or solid in an unexpectedly higher yield than that obtained using hydrogen peroxide as a promoter in an aqueous system. The term "substantially anhydrous," as employed in the present invention, includes reaction mixtures in which water may be present in quantities up to about 2.5 parts by weight per 100 parts by weight of monomer charged. Preferably, the reaction mixture will not contain more than 1 part of water per 100 parts of monomer originally charged. Generally speaking, the yield of polymer is increased as completely anhydrous conditions are approached, but due to the practical impossibility of using completely anhydrous reactants and promoter, it will generally be necessary to have some water present in the reaction mixture. For example, it will generally be necessary to employ 90 percent by weight hydrogen peroxide, as this is the commercial form of this reagent of highest purity. Using anhydrous hydrogen peroxide would be prohibitive from a cost standpoint, although it would be desirable from a purely theoretical standpoint.

As employed herein, the term "polymerization" refers to the polymerization of a single monomer and also the copolymerization of unlike monomers to produce polymers.

The present invention is particularly applicable to the homopolymerization of perfluorochloroolefins, such as trifluorochloroethylene, but it is also applicable to the polymerization of other halogenated olefins, such as perfluorobutadiene, perfluoropropene, phenyltrifluoroethylene, alpha methyl phenyl difluoroethylene, perfluoroacrylonitrile, perfluorostyrene, perfluorocyclobutene, tetrafluoroethylene, vinylidene fluoride, trifluoroethylene, and difluorodichloroethylene. The invention also applies to the copolymerization of these monomers, for example, the copolymerization of trifluorochloroethylene and tetrafluoroethylene, trifluorochloroethylene and vinylidene fluoride, trifluorochloroethylene and vinyl fluoride, trifluorochloroethylene and vinyl chloride, trifluorochloroethylene and vinylidene chloride, trifluorochloroethylene and perfluoropropene, trifluorochloroethylene and trifluoroethylene, and perfluorobutadiene and perfluorostyrene. In copolymerization reactions, both monomers preferably are fluorinated and contain at least two fluorine atoms per molecule. When less than 5 percent by weight of comonomer is employed, the process is included within the term "homopolymerization."

The temperatures employed for the polymerization reactions will depend to a degree upon the particular monomers being polymerized, and in general, the temperatures range between about 0° C. and about 250° C., in conjunction with suitably high pressures to maintain the monomer in the liquid state. Pressures range from about 20 to about 1500 p.s.i.g., the lower pressures being generally employed with the lower temperatures of polymerization. In the production of solid polymers of trifluorochloroethylene, for example, the reaction temperature is desirably in the range of about 0 to 40° C. and the reaction time may be about 10 to 90 hours; also, longer or shorter reaction times may be employed in the range of about 10 minutes to 100 hours. Reaction times in the range of about 50 to 100 hours and reaction temperatures in the range of about 15 to 30° C. are preferred.

The hydrogen peroxide promoter may be present in the reaction mixture in a concentration of 0.01 to 15 parts by weight per 100 parts by weight of monomer charged, the exact quantity depending upon the monomer employed, the molecular weight of the polymer desired, and the particular promoter being employed.

The process of the invention is conducted in a vessel which is incapable of being attacked by the reactants employed and such corrosion resistant materials include stainless steel, Monel metal, nickel, and glass. The liquid in the reaction zone must be vigorously agitated, and this agitation may be accomplished by propeller type agitators connected to high speed electric motors. Forced circulation of the liquid phase through orifices is also an effective method for achieving intimate mixing of the reactants.

It is also within the contemplation of this invention to disperse finely divided solids in the liquid phase of the reaction mixture for the purpose of forming nuclei for the initiation of the polymerization reaction and also for the use of the solids as fillers in the polymer product. Among such fillers may be employed titanium dioxide, carbon black, clay, asbestos, glass fiber, and other inert materials.

The invention will be further illustrated by reference to the following specific example:

EXAMPLE I

A series of polymerization runs was conducted in glass tubes of 200–250 ml. capacity, the contents of which were agitated during the runs by tumbling the tubes. The promoter and additive, if any, were first charged to the tubes and frozen in a solid carbon dioxide-acetone bath, after which the monomer was charged to the tubes using a closed system to eliminate air. The tubes were sealed under vacuum and the polymerizations were conducted under the conditions given in the table below, in which the results are also given:

Table 1

POLYMERIZATION OF $CF_2=CFCl$ USING $H_2O_2$ AS A PROMOTER

[All parts by weight. Each run using 100 parts by weight $CF_2=CFCl$]

| Run No. | Parts $H_2O_2$ (100%) | Parts $H_2O$ | Parts Added Compound | Time (hrs.) | Temp. (°C.) | Percent Yield |
|---|---|---|---|---|---|---|
| 1 | 3.0 | 0.3 | | 70 | 20 | 66.1 |
| 2 | 6.0 | 0.6 | | 70 | 20 | 47.7 |
| 3 | 3.0 | 0.3 | | 20 | 30 | 11.2 |
| 4 | 3.0 | 0.3 | 20.0 $C_2F_5CO_2H$ | 20 | 30 | 21.1 |
| 5 | 3.0 | 0.3 | 0.5 KOH | 20 | 30 | 23.7 |
| 6 | 3.0 | 7.0 | | 66 | 20 | 6.0 |
| 7 | 6.0 | 14.0 | | 66 | 20 | 5.3 |

The above data show that the polymerization reaction is favored by using reactants which are substantially anhydrous and also by employing relatively low reaction temperatures and relatively long reaction times. The yield of polymer is also increased by the addition of perfluorinated carboxylic acids and materials such as potassium hydroxide to the reaction mixture, as shown by runs 4 and 5 in the above table. Other materials which have been found to enhance the yield of polymer product are sodium peroxide, zinc oxide, and perfluorocarboxylic acids generally, such as perfluorocaprylic acid.

The desired polymerization reaction is also augmented by the use of substantially pure reactants, promoter, and additives, as there are many materials which normally occur as impurities in these compounds which have a deleterious effect upon the polymerization reaction.

The polymer products of the invention, if produced under completely anhydrous conditions, contain end groups which are —COCl or —COF. However, due to the presence of small quantities of water in the reaction mixture, the polymer products generally contain a mixture of —COCl, —COF, and —COOH end groups. The —COCl and —COF end groups are then hydrolyzed to —COOH groups by washing the polymer products with water or by allowing them to stand exposed to the air whereby the end groups are hydrolyzed by atmospheric moisture. The presence of the —COOH groups was established from the neutralization equivalents of samples of the polymer products. The neutralization equivalents were obtained by titrating hot xylene solutions of polymer samples with 0.1 N alcoholic potassium hydroxide.

It will be obvious to those skilled in the art that many modifications may be made within the scope of the present invention without departing from the spirit thereof, and the invention includes all such modifications.

We claim:

1. A process for polymerizing a substituted 2 to 4 carbon olefin monomer having at least two fluorine atoms which comprises polymerizing the monomer at a pressure sufficient to maintain the monomer in the liquid phase at a temperature between about 0° C. and about 250° C. in the presence of hydrogen peroxide as a promoter and not more than about 2.5 parts by weight of water per 100 parts by weight of monomer.

2. A process according to claim 1 in which the hydrogen peroxide is present in a quantity equivalent to about 0.01 to 15 parts by weight per 100 parts by weight of monomer initially charged.

3. A process for polymerizing trifluorochloroethylene monomer which comprises polymerizing the monomer at a pressure sufficient to maintain the monomer in the liquid phase at a temperature between about 0° C. and about 250° C. in the presence of hydrogen peroxide as a promoter and not more than about 2.5 parts by weight of water per 100 parts by weight of monomer.

4. A process according to claim 1 in which the monomer is perfluorobutadiene.

5. A process according to claim 1 in which the monomer is trifluorochloroethylene and is polymerized with a polyfluoroethylene.

6. A process according to claim 1 in which the monomer is trifluorochloroethylene and is polymerized with a vinylidene halide.

7. A process according to claim 1 in which the monomer is trifluorochloroethylene and is polymerized with a vinyl halide.

8. A process according to claim 1 in which the polymerization is conducted in the presence of a perfluorocarboxylic acid.

9. A process according to claim 3 in which the polymerization is conducted in the presence of a perfluorocarboxylic acid.

References Cited in the file of this patent

UNITED STATES PATENTS

| | | |
|---|---|---|
| 2,564,024 | Miller | Aug. 14, 1951 |
| 2,716,109 | Ruh et al. | Aug. 23, 1955 |